Nov. 23, 1965   R. C. BUELER   3,219,396
CONTROL VALVE
Filed April 23, 1963   3 Sheets-Sheet 1

INVENTOR
RICHARD C. BUELER
BY Joseph E. Rupio

INVENTOR
RICHARD C. BUELER
BY Joseph E. Papio

United States Patent Office 3,219,396
Patented Nov. 23, 1965

3,219,396
CONTROL VALVE
Richard C. Bueler, Glendale, Mo., assignor to Wagner Electric Corporation, St. Louis, Mo., a corporation of Delaware
Filed Apr. 23, 1963, Ser. No. 274,984
7 Claims. (Cl. 303—52)

This invention relates to control valves and in particular to tandem type control valves for controlling separate fluid pressure systems.

In the past, control valves were provided with separate valves therein for controlling pressure fluid flow in separate systems, and such separate valves were actuating by separate valve control or reaction members which, in turn were connected by yoke-type linkage, or the like, to an operator pedal or treadle. One of the undesirable features of the past control valves was that separate reaction forces, which provided "feel" as to the extent of the breaking effort, were each transmitted to the operator through the yoke-type linkage from the separate valve control members. Another undesirable feature was that the "feel" varied appreciably upon failure of fluid pressure in one of the separate systems effecting variation in controllability which tended to confuse the operator. Another undesirable feature was that an appreciable lost stroke in the operator treadle also accompanied the failure of fluid pressure in one of the separate systems. And still another undesirable feature was the requirement of an intermediate yoke-type connecting linkage between the separate valve control members and the operator treadle.

It is an object of the present invention to provide a control valve which overcomes the aforementioned undesirable features, and this and other objects and advantages will become more apparent hereinafter.

Briefly, the invention embodies a control valve mechanism and system wherein a pair of resiliently urged apart valve control members are movable in response to an applied force on one of said members to actuate a pair of valve means for controlling the application of fluid pressure from a pair of fluid pressure sources to a pair of servo motors. In addition, in the event of fluid pressure failure at one of the sources, the valve control members are movable to establish fluid pressure between the other of the sources and its associated servo motor while affording substantially the same "feel" to the operator as when both of said sources are operative.

The invention also consists of the parts and arrangement of parts hereinafter described and claimed. In the accompanying drawings which form a part of the specification and wherein like numerals refer to like parts wherever they occur;

Figure 1:
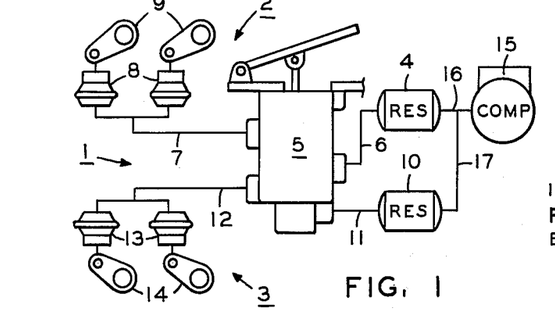
FIG. 1 is a diagrammatic view of a fluid pressure system showing a control valve embodying the present invention therein.

Referring now to FIG. 1 in detail, a dual brake actuating system 1 is shown having separate fluid pressure branches, indicated generally at 2 and 3. The branch 2 includes a reservoir 4 for fluid pressure storage which is connected to one of a pair of inlet ports of a treadle operated tandem control valve 5 by a conduit 6. The tandem control valve 5 is also provided with a pair of separate outlet ports, and a service line or conduit 7 connects one of said outlet ports with a set of brake chambers 8 which are operatively linked with slack adjusters 9 to control the energization of an axle set of vehicle brake assembles (not shown). The branch 3 includes a reservoir 10 for fluid pressure storage which is connected to the other of the inlet ports of the control valve 5 by a conduit 11, and another service line or conduit 12 connects the other of the outlet ports of said control valve with another set of brake chambers 13 which are operatively linked with slack adjusters 14 to control the energization of another axle set of vehicle brake assemblies (not shown). To complete the system 1, a compressor 15 is connected with the reservoir 4 by a conduit 16 and with the reservoir 10 by a conduit 17 which branches from the conduit 16, said compressor and separate reservoirs forming, in combination, separate fluid pressure sources.

Figure 2:
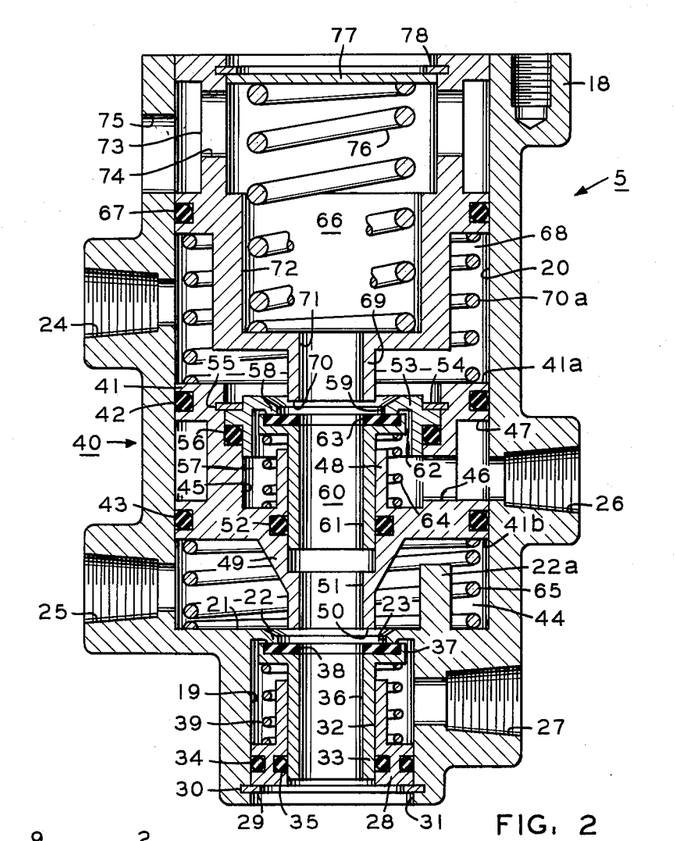
FIG. 2 is a greatly enlarged cross-sectional view of the control valve shown in FIG. 1, and FIGS. 3 and 4 are cross-sectional views of other control valves embodying the present invention.

The tandem control valve 5, FIG. 2, is provided with a housing 18 having an axial bore 19 and counterbore 20, said bore 19 forming an inlet chamber. A radially extending wall 21 is integrally formed in said housing between the bore 19 and counterbore 20 having a valve seat 22 thereon in said bore and a piston stop 22a thereon in said counterbore. A connecting passage 23 in the wall 21 extends coaxially through the valve seat 22 between the bore 19 and counterbore 20. Outlet ports 24 and 25 which receive the conduits 7 and 12, respectively, as previously mentioned, are provided in the housing 18 near the upper and lower ends of the counterbore 20, respectively, and an inlet port 26 which receives the conduit 6, as previously mentioned, is also provided in said housing connecting with said counterbore near the mid-portion thereof and spaced between said outlet ports. Another inlet port 27 which receives the conduit 11, as previously mentioned, is provided in said housing and connects with the bore 19. As will become apparent hereinafter, inlet and outlet ports 27 and 25 form one separate set of ports, and inlet and outlet ports 26 and 24 form another separate set of ports.

A valve guide member 28 is positioned in the bore 19 against displacement by a snap ring 29 received in a groove 30 adjacent the lower end of said bore, and the lower end of said bore forms an exhaust port 31. The valve guide member 28 is provided with a bore 32 in which an inlet valve element 33 is slidable, and seals 34 and 35 are carried by said valve guide member in sealing engagement with the bore and said inlet valve element, respectively. The inlet valve element 33 is provided with an axial bore or exhaust opening 36 and has an enlarged sealing head 37 on the upper end thereof, said sealing head including an annular resilient seal or disc 38. A spring 39 is provided between the valve guide member 28 and the sealing head 37 and normally urges the valve seal 38 into sealing engagement with the valve seat 22 on the housing wall 21.

A piston or valve control member, indicated generally at 40, is provided with a body 41 slidable in the counterbore 20 between the port sets 25, 27 and 24, 26, and said body 41 is provided with upper and lower opposed ends 41a and 41b of substantially equal area. Seals 42 and 43 are carried in the piston body 41 adjacent the upper and lower ends 41a and 41b thereof in sealing engagement with the counterbore 20. An outlet or reaction chamber 44 is formed in the counterbore 20 between the housing wall 21 and the piston body lower end 41b in open pressure fluid communication with the outlet port 25, and said outlet chamber is normally exhausted to atmosphere through the exhaust opening 36 of the valve element 33 and the exhaust port 31 The piston body 41 is provided with a centrally located stepped bore 45 which is connected by a passage 46 with an annular recess 47 provided in the peripheral surface of said piston body between the seals 42 and 43, and said annular recess is in open pressure fluid communication with the inlet port 26 at all times. The piston body 41 is also integrally provided with a valve guide hub 48 which extends coaxially into the stepped bore 45, and an integral extension 49 is coaxially provided on the lower piston body end 41b, said extension having a valve seat 50 formed on the free end thereof for cooperative engagement with the valve element 33. An axial passage or valve bore 51 extends coaxially through the valve seat 50, the extension 49 and the hub 48, and a seal 52 is positioned therein. A wall or seating member 53 is positioned in the piston body stepped bore 45 against displacement by a snap ring 54 received in a groove 55 adjacent the upper end of said stepped bore, and a seal 56 is sealably engaged between said wall member and the shoulder formed in said stepped bore 45. Another inlet chamber or valve chamber 57 is formed in the stepped bore 45 between the lower end wall thereof and the wall member 53 and includes the passage 46 and peripheral recess 47, said inlet chamber being in open pressure fluid communication with the inlet port 26 at all times. A valve seat 58 is provided in the inlet chamber 57 on the wall member 53, and a connecting passage 59 extends coaxially through said valve seat. Another inlet valve element 60 is slidably received in the valve guide bore 51 in sealing engagement with the seal 52 therein. The inlet valve element 60 is provided with an axial bore or exhaust opening 61 therethrough and has an enlarged sealing head 62 on the upper end thereof which includes an annular resilient sealing member or disc 63. A valve spring 64 is provided between the piston body 41 and the sealing head 62 and normally urge the valve seal 63 into sealing engagement with the valve seat 58 formed on the wall member 53. A return spring 65 is interposed between the lower piston body end 41b and the housing wall 21 and normally maintains the valve seat 50 in the piston extension 49 in spaced relation with the valve seal 38 of the valve element 33.

Another piston or valve control member 66 is slidably received in the upper end of the housing counterbore 20, and a seal 67 is carried by said piston in sealing engagement with said counterbore. Another outlet or reaction chamber 68 is formed in the housing counterbore 20 between the upper piston body end 41a and the piston 66 in open pressure fluid communication with the outlet port 24. The piston 66 is provided with an extension 69 having a valve seat 70 on the lower or free end thereof which is coaxial with the connecting passage 59 in the wall member 53; and said valve seat is normally maintained in spaced relation with the valve seal 63 of the valve element 60 by a return spring 70a biased between the piston body upper end 41a and the piston 66, said return spring normally urging the piston 66 away from the piston 40 to its normal released or inoperative position, as shown. An exhaust passage or opening 71 extends coaxially through the valve seat 70 and connects with a stepped bore 72 in the piston 66. A peripheral groove 73 is provided adjacent to the upper end of the piston 66 and is connected with the piston stepped bore 72 by cross-passages 74, said peripheral groove being in open communication at all times with an exhaust port 75 which connects with the housing counterbore 20 adjacent to the upper end thereof. The outlet port 24 and outlet chamber 68 are normally vented to atmosphere through the exhaust passage 71, piston bore 72, the cross-passages 74 and peripheral groove 73 to the exhaust port 75. To complete the control valve 5, a precompressed metering spring 76 is provided in the piston bore 72 and biased between the piston 66 and a retainer or treadle force receiving plate 77. The treadle plate 77 is slidable in the piston bore 72 and is normally biased into abutting engagement with a snap ring and groove assembly 78 provided adjacent to the upper end of said piston bore by the compressive force of the metering spring 76.

Although the exhaust passage 71 in piston 66 is shown and described as communicating the outlet chamber 68 with the atmosphere, it is apparent that said exhaust passage can be alternatively omitted from the construction of the control valve 5 since said outlet chamber can also be vented to atmosphere through the exhaust opening 61 of the valve element 60, the valve bore 51 in the relay piston body 41, the outlet chamber 44, the exhaust opening 36 of the valve element 33 and the exhaust port 31. Another alternative construction is to omit the exhaust opening 31 from the valve element 33 so that the outlet port 25 and outlet chamber 44 are vented to atmosphere through the valve bore 51 in the piston body 41, the exhaust opening 61 in the valve element 60, the exhaust passage 71 and bore 72 in the piston 66 and the cross-passages 74 and peripheral groove 73 and the exhaust port 75. And, of course, still another alternative construction is to omit the exhaust opening 61 from the valve element 60 wherein the outlet port 24 and outlet chamber 68 is vented to atmosphere through the exhaust passage 71 and the outlet port 25 and outlet chamber 44 is vented to atmosphere through the exhaust opening 36 of the valve element 33.

In the operation of the above-described control valve 5 in the system 1, it is preferred to predetermine substantially simultaneous actuation of the system branches 2 and 3 by effecting substantially simulanteous opening of the valve elements 60 and 33 which respectively control said branches. This accomplished by substantially balancing the magnitudes of the combined forces of the valve and return springs 64 and 70a and the seating force of the fluid pressure in the inlet chamber 57 acting to maintain the valve element 60 in engagement with the seat 58 against the magnitudes of the combined forces of the valve and return springs 39 and 65 and the seating force of the fluid pressure in the inlet chamber 19 acting to maintain the valve element 33 in engagement with the seat 22.

Assuming that the abovementioned forces which control the sequence of operation of the valve elements 33 and 60 are substantially balanced as above described, a manual force applied by the operator through the foot treadle to the force receiving plate 77 of the piston 66 moves said piston downwardly against the compressive force of the return spring 70a to engage the seat 70 with the valve element 60 closing the exhaust opening 61 and the exhaust passage 71 to isolate the outlet chamber 68 from the atmosphere. At the same time, the manual force is transmitted through the return spring 70a to effect substantially simultaneous downward movement of the piston 40 against the return spring 65 to engage the seat 50 on the piston extension 49 with the valve element 33 closing the exhaust opening 36 and the valve bore 51 to isolate the outlet chamber 44 from the atmosphere. Further downward movement of the pistons 40 and 66 effects substantially simultaneous disengagement of the inlet valves 33 and 60 from their seats 22 and 58 to establish pressure fluid communication between inlet and outlet ports 27 and 25 and between inlet and outlet ports 26 and 24, respectively. The pressure fluid flows in the system branch 2 from the reservoir 4 through the conduit 6, the inlet port 26, the inlet chamber 57 and the passage 59 into the outlet chamber 68 and therefrom through the outlet port 24 into the service line 7 to actuate the brake chambers 8 which, in turn, rotate slack adjusters 9 to energize the axle set of wheel brake assemblies associated therewith. Pressure fluid also flows in the system branch 3 from the reservoir 10 through the conduit 11, the inlet port 27, the inlet chamber 19 and the passage 23 into the outlet chamber 44 and therefrom into the service line 12 to actuate brake chambers 13 which, in turn, rotate slack adjusters 14 to energize the axle set of wheel brake assemblies associated therewith. It should be noted that the magnitudes of the fluid pressures so metered by the valve elements 60 and 33 through the system branches 2 and 3 are substantially equal due to the aforementioned predetermined equalization of the forces which control the sequence of operation of said valve elements. Also, since the valve elements 33 and 60 are substantially balanced in their open positions and the areas of the piston body ends 41a and 41b are substantially equal, the reaction forces of the substantially equal fluid pressures in the outlet chambers 44, 68 acting on said piston body ends are self-cancelling.

When the reaction force created by the established fluid pressure in the outlet chamber 68 acting on the effective area of the piston 66 equals the manually applied force, the piston 66 is moved upwardly against the metering spring 76, and the force of the return spring 65 effects concert upward movement of the piston 40 therewith. This upward movement of the pistons 40 and 66 positions the valve elements 33 and 60 in lapped engagement with their seats 22 and 58 and positions the piston seats 50 and 70 in lapped engagement with the valve elements 33 and 60, respectively. The reaction force acting through the metering spring 76 against the manually applied force on the plate 77 is substantially equal and opposite thereto and affords the operator an accurate and direct "feel" as to the extent of the braking effort or application. If greater braking effort is desired, the manually applied force is increased which results in an increased application force, and the component parts of the control valve 5 function in the same manner, as previously described, to again move said component parts to their lapped positions.

When the desired braking effort is attained, the manually applied force is removed from the piston 66, and return springs 65 and 70a and the reaction force move pistons 40 and 66 upwardly toward their original positions. This upward movement of the pistons 40 and 66 disengages their seats 50 and 70 from the valve elements 33 and 60 opening the exhaust openings 36 and 61 therein along with the piston body bore 51 and the exhaust passage 71 to reestablish communication between the outlet chambers 44 and 68 and the atmosphere. In this manner, the wheel brake assemblies associated with the brake chambers 8 are deenergized and the reaction forces are eliminated by exhausting fluid pressure from said brake chambers through the service line 7, the outlet port 24, and the outlet chamber 68, the exhaust passage 71 and bore 72 of the piston 66 and the cross-passages 74 and peripheral groove 73 to the exhaust port 75. At the same time, the wheel brake assemblies associated with the brake chambers 13 are also de-energized by exhausting fluid pressure from said brake chambers through the service line 12 and the outlet port 25 into the outlet chamber 44 and therefrom through the exhaust opening 36 in the valve element 33 to the exhaust port 31.

In the event of failure of the branch 2 with a resultant loss of the fluid pressure in the reservoir 4, the manually applied force moves the pistons 66 and 40 downwardly to actuate the inlet valves 60 and 33, as previously described. Since it is assumed that the branch 2 has failed, the establishment of fluid pressure in said branch is, of course, obviated; however, fluid pressure flow is established in the branch 3 to actuate the brake chambers 13 and energize the wheel brake assemblies associated therewith. The fluid pressure so established in the outlet chamber 44 acts on the effective area of the piston body lower end 41b creating a reaction force which moves the piston 40 upwardly to engage the piston body upper end 41a with the piston 66; however, this upward movement of the piston 40 permits the valve element 33 to close, and it is necessary for the operator to slightly increase the treadle stroke to effect further concert downward movement of the engaged pistons 40 and 66 to further actuate the valve element 33 and meter fluid pressure to the brake chambers 13. Since the pistons 40 and 66 are in abutment, the reaction force is directly opposed to the manually applied force to afford the operator a direct and accurate "feel" as to the extent of the braking application. It should be noted that the lost or increased operator treadle stroke is maintained at a minimum upon failure of the branch 2. In other words, the lost stroke represents only the movement of the piston 40 into engagement with the piston 66 after the valve elements 33 and 60 are initially opened.

In the event of the failure of the branch 3 with the resultant loss of the fluid pressure in the reservoir 10, the manually applied force moves the pistons 66 and 40 downwardly to actuate the inlet valves 60 and 33, as previously described. Since it is assumed that the branch 3 has failed, the establishment of fluid pressure in said branch is, of course, obviated; however, fluid pressure flow is established in the branch 2 to actuate the brake chambers 8 and energize the wheel brake assemblies associated therewith. The fluid pressure so established in the outlet chamber 68 acts on the effective area of the piston body end 41a to move said piston further downwardly into abutment with the piston 22a on the housing wall 21; however, this downward movement permits the valve element 60 to close, and it is necessary for the operator to slightly increase the treadle stroke to effect further downward movement of the piston 66 to further actuate the valve element 60 and meter fluid pressure to the brake chambers 8. The fluid pressure metered to the brake chambers 8 also acts on the effective area of the piston 66 in the outlet chamber 68 to create a reaction force substantially equal and opposite to the manually applied force thereby affording the operator a direct and accurate "feel" as to the extent of the braking application. It should be noted that the lost stroke or increased treadle stroke is maintained at a minimum upon failure of the branch 3. In other words, the lost stroke represents only the movement of the piston 40 into engagement with the piston stop 22a after the valve elements 33 and 60 are initially opened.

In the above described operation of the control valve 5 in the system 1, the substantially simultaneous actuation of system branches 2 and 3 or the opening of valve elements 33 and 60 has been predetermined by substantially balancing the magnitudes of the combined forces of the valve and return springs 64 and 70a and the seating force on the valve element 60 against that of the combined forces of the valve and return springs 39 and 65 and the seating force on the valve element 33. It therefore follows that if the magnitude of the combined forces are predeterminately unbalanced it is possible to predeterminately sequence the actuation of system branches 2 and 3 or the opening of valve elements 33 and 60. This sequenced operation of the control valve 5 is substantially the same as that described above for the balanced operation of said control valve except that the manually applied force on the piston 66 will initially effect the opening of only one of the valve elements 33 or 60, and the fluid pressure metered into either the outlet chamber 44 or the outlet chamber 68 by the opened valve element will act on the effective area of the piston 40 to move the piston 40 in a valve element opening direction to either engage its seat 50 with the valve element 33 to effect the unseating or opening thereof or to move the valve element 60 into engagement with the reaction piston seat 70 to effect the unseating or opening thereof. In this manner, the valve elements 33 and 60 are opened in sequence and fluid pressure flow is sequentially established in the branches 2 and 3. Further, it is obvious that the fluid pressure first applied by the first opened valve element will react against the piston 40 thereby tending to lap such first opened valve element and, at the same time, open the other or the thus far unactuated valve element. It is apparent that the last opened valve element will meter a fluid pressure having a lesser magnitude than that metered by the first opened valve element due to the predetermined proportional difference in the magnitudes of the above discussed forces which control the sequential opening of said valve elements.

Figure 3:
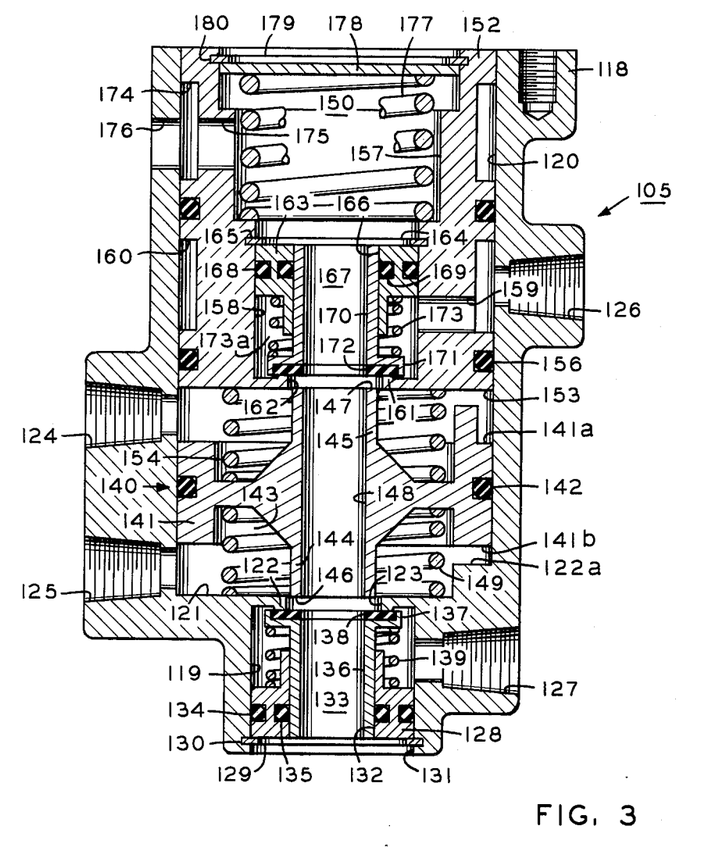

Referring now to FIG. 3, a tandem type control valve 105 is shown for connection in the system 1 and functions therein in substantially the same manner as the previously described tandem type control valve 5 with the following exceptions. The control valve 105 is provided with a housing 118 having an axial bore 119 and counterbore 120, said bore 119 forming an inlet chamber. A radialy extending wall 121 is integrally formed in said housing between the bore 119 and counterbore 120 having a valve seat 122 thereon in said bore and a piston stop 122a thereon in said counterbore. A connecting passage 123 is provided in the housing wall 121 and extends coaxially through the valve seat 122 between the bore 119 and the counterbore 120. Outlet ports 124 and 125 which receive the conduits 7 and 12, respectively, as previously mentioned, are provided in the housing 118 adjacent the mid-portion and lower end of the counterbore 120, respectively, and an inlet port 126 which receives the conduit 6, as previously mentioned, is also provided in said housing connecting with said counterbore between the outlet port 124 and the open end of said counterbore. Another inlet port 127 which receives the conduit 11, as previously mentioned, is provided in the housing and connects with the bore 119. As will become apparent hereinafter, inlet and outlet ports 127 and 125 form one separate set of ports, and inlet and outlet ports 126 and 124 form another separate set of ports.

A valve guide member 128 is positioned in the bore 119 against displacement by a snap ring 129 received in a groove 130 adjacent the lower end of said bore, and the lower end of said bore forms an exhaust port 131. Valve guide member 128 is provided with a bore 132 in which an inlet valve member 133 is slidable, and seals 134 and 135 are carried by said valve guide member in sealing engagement with the bore and said inlet valve element, respectively. The inlet valve element 133 is provided with a bore or exhaust opening 136 and has an enlarged sealing head 137 on the upper end thereof, said sealing head including an annular seal or disc 138. A spring 139 is provided between the valve guide member 128 and the sealing head 137 and normally urges the sealing head 137 into engagement with the valve seat 122 on the housing wall 121.

A piston or valve control member, indicated generally at 140, is provided with a body 141 slidable in the counterbore 120 between the port sets 125, 127 and 124, 126, and said piston body 141 is provided with upper and lower opposed ends 141a and 141b of substantially equal area. A seal 142 is carried in the peripheral portion of the piston body 141 between the upper and lower ends 141a and 141b thereof in sealing engagement with the counterbore 120. An outlet or reaction chamber 143 is formed in the counterbore 120 between the housing wall 121 and the lower piston body end 141b in open pressure fluid communication with the outlet port 125 and is normally exhausted to atmosphere through the exhaust opening 136 of the valve element 133 and the exhaust port 131. The piston body 141 is provided with integrally formed opposed extensions 144 and 145 having valve seats 146 and 147 on the free ends thereof, respectively. An exhaust bore or passage 148 in the piston body 141 and extensions 144 and 145 extends coaxially through the opposed valve seats 146 and 147, and a return spring 149 is interposed between the lower piston body end 141b and housing wall 121 to normally maintain seat 146 in predetermined spaced relation with the valve element 133.

Another piston 150 is provided with a body 151 slidable in the counterbore 120 and having opposed upper and lower ends 152 and 153 of substantially equal area. Another return spring 154 is interposed between the upper piston body end 141a and the lower piston body end 153 so that the lower piston body end 152 is normally positioned between the inlet and outlet ports 126 and 124 and an outlet chamber 154a is formed in the counterbore 120 between the upper piston body end 141a and lower piston body end 153 in open pressure fluid communication with the outlet port 124 at all times. Seals 155 and 156 are carried in the piston body 151 adjacent the lower end 153 thereof and the mid-portion thereof in sealing engagement with the counterbore 120. The piston body 151 is provided with centrally located stepped bores 157 and 158, and the stepped bore 158 is connected by a passage 159 with an annular recess 160 provided in the peripheral surface of said piston body between the seals 155 and 156, said annular recess being in open pressure fluid communication with the inlet port 126 at all times. A valve seat 161 is provided in the stepped bore 158 and a connecting passage 162 extends coaxially through the valve seat 161 between said stepped bore and the outlet chamber 154a. A valve guide member 163 is positioned in the stepped bore 158 against displacement by a snap ring 164 received in a groove 165 adjacent the upper end of the stepped bore 158. The valve guide member 163 is provided with a bore 166 in which an inlet valve element 167 is slidable and seals 168 and 169 are carried by said valve guide member in sealing engagement with the stepped bore 158 and the valve element 167, respectively. The inlet valve element 167 is provided with an axial bore or exhaust opening 170 and has an enlarged sealing head 171 on the lower end thereof, said sealing head including an annular resilient seal or disc 172. A valve spring 173 is provided between the valve guide member 163 and the sealing head 171 and normally urges the valve seal 172 into sealing engagement with the valve seat 161. An inlet chamber 173a is formed in the stepped bore 158 between the lower end wall thereof and the valve guide member 163 and includes the passage 159 and peripheral recess 160, said inlet chamber being in open pressure fluid communication with the inlet port 126 at all times. Another peripheral groove 174 is provided in the piston body 151 between the seal 155 and the upper end of said piston body which is connected with the stepped bore 157 by a cross passage 175. The peripheral groove 174 is in open communication at all times with an exhaust port 176 provided in the housing 118 and connected with the counterbore 120 adjacent the upper end thereof. To complete the control valve 105, a precompressed metering spring 177 is retained in the stepped bore 157 by a retainer or treadle force receiving plate 178. The treadle plate 178 is slidable in the stepped piston bore 157 and is normally biased into abutting engagement with a snap ring 179 positioned in a groove 180 in the upper end of the piston bore 157 by the compressive force of the metering spring 177.

Although the exhaust openings 136 and 170 in valve elements 133 and 167 are shown and described as communicating the outlet chambers 143 and 154a, it is apparent that an alternate construction for the tandem control valve 105 is to omit the exhaust opening 136 from the valve element 133 or to omit the exhaust opening 170 from the valve element 167. With the exhaust opening 170 omitted from the valve element 167, it is apparent that the outlet chamber 154a will be vented to atmosphere through the exhaust bore 148 of the piston 140, the outlet chamber 143 and the exhaust opening 136 of the valve element 133 to the exhaust port 131. With the exhaust opening 136 of the valve element 133 omitted, it is apparent that the outlet chamber 143 is exhausted to atmosphere through the exhaust bore 148 of the piston 140, the outlet chamber 154a, exhaust opening 170 of the valve element 167, the stepped bore 157, cross passage 175, and peripheral groove 174 of the piston 150 to the exhaust port 176.

In the operation of the above described control valve 105 in the system 1, it is preferred to predetermine substantially simultaneous actuation of the system branches 2 and 3 by effecting substantially simultaneous opening of the valve elements 133 and 167 which respectively control said branches. This is accomplished by substantially balancing the magnitudes of the combined forces of the valve and return springs 173 and 154 and the seating force of the fluid pressure in the inlet chamber 173a acting to maintain the valve element 167 in engagement with the seat 161 against the magnitude of the combined forces of the valve and return springs 139 and 149 and the seating force of the fluid pressure in the inlet chamber 119 acting to maintain the valve element 133 in engagement with the seat 122. Assuming that the forces are equally balanced, as previously described, a manual force applied by the operator through the foot treadle to the force receiving plate 178 of the piston 150 moves said piston downwardly to engage the valve seal 172 of the valve element 167 with the seat 147 on the piston extension 145 closing the exhaust opening 170 and the exhaust bore 148 to isolate the outlet chamber 154a from the atmosphere, and at the same time the manual force is transmitted through the return spring 154 to effect simultaneous downward movement of the piston 140 against the return spring 149 to engage the seat 146 on the piston extension 144 with the valve seal 138 of the valve element 133 closing the exhaust opening 136 and the valve bore 148 to isolate the outlet chamber 143 from the atmosphere. Further downward movement of the pistons 140 and 150 effects substantially simultaneous disengagement of the inlet valve 133 from its seat 122 and valve seat 161 from the inlet valve seal 172 to establish pressure fluid communication between the inlet and outlet ports 127 and 125 and between the inlet and outlet ports 126 and 124, respectively. The pressure fluid flows in the system branch 2 from the reservoir 4, from the conduit 6, the inlet port 126, the inlet chamber 173a, and the connecting passage 162 into the outlet chamber 154a, and therefrom through the outlet port 124 into the service line 7 to actuate brake chamber 8 which, in turn, rotates slack adjusters 9 to energize the axle set of wheel brake assemblies associated therewith. Pressure fluid also flows in the system branch 3 from the reservoir 10 through the conduit 11, the inlet port 127, the inlet chamber 119 and the connecting passage 123 through the outlet chamber 143 and therefrom through the outlet port 125 into the service line 12 to actuate brake chambers 13 which, in turn, rotate slack adjusters 14 to energize the axle set of wheel brake assemblies associated therewith. It should be noted that the magnitudes of the fluid pressures to be metered by the valve elements 167 and 133 through the system branches 2 and 3 are substantially equal, and since said valve elements are equally balanced in their open positions and the areas of the opposing ends 141a and 141b of the piston 141 are substantially equal, the force of the substantially equal fluid pressure in the inlet chambers 143 and 154a acting on the substantially equal opposing effective areas of the relay piston 140 are self-cancelled.

When the reaction force created by the established fluid pressure in the outlet chamber 154a acting on the effective area of the piston 150 equals the manually applied force, the piston 150 is moved upwardly against the metering spring 177 and the force of the return spring 149 effects concert upward movement of the piston 150 therewith. It should be noted that the piston ends 141a and 141b are substantially equal and the fluid pressures in outlet chambers 143 and 154a are normally substantially equal; therefore, the reaction forces created by such fluid pressures acting on said piston ends are self-cancelling. This upward movement of the pistons 140 and 150 positions the valve elements 133 and 167 in lapped engagement with their seats 122 and 161 and positions the seats 146 and 147 on the piston 140 in lapped engagement with the valve elements 133 and 167, respectively. The reaction force acting through the metering spring 177 against the manually applied force on the plate 178 is substantially equal and opposite thereto and affords the operator an accurate and direct "feel" as to the extent of the braking effort of application. If greater braking effort is desired, the manually applied force is increased which results in an increased application force, and the component parts of the control valve 105 function in the same manner as previously described to again move said component parts to their lapped positions.

When the desired braking effort is attained, the manually applied force is removed from the piston 150 and the return springs 149 and 154 reaction forces move pistons 140 and 150 upwardly toward their original positions. This upward movement of the pistons 140 and 150 disengages the extension valve seat 146 on the piston 140 from the valve element 133 and disengages the valve element 167 from the extension valve seat 147 on the piston 140 thereby opening exhaust passages 136 and 170 along with the passage 148 in piston 140 to re-establish communication between the outlet chambers 143 and 154a and the atmosphere. In this manner, the wheel brake assemblies associated with the brake chambers 8 are de-energized by exhausting fluid pressure from said brake chambers through the service line 7 to outlet port 124, the outlet chamber 154a, the exhaust opening 170 of the valve element 167 to the exhaust port 176. At the same time, the wheel brake assemblies associated with the brake chambers 13 are also de-energized by exhausting fluid pressure from said brake chambers through the service line 12, outlet port 125 into the outlet chamber 123 and therefrom through the exhaust opening 136 in the valve element 133 to the exhaust port 131.

In the event of failure of the branch 2 with the resultant loss of fluid pressure in the reservoir 4, the manually applied force moves the pistons 150 and 140 downwardly to actuate the valve elements 167 and 133, as previously described. Since it is assumed that the branch 2 has failed, the establishment of the fluid pressure in said branch is, of course, obviated; however, fluid pressure flow is established in the branch 3 to actuate the brake chambers 8 and energize the wheel brake assemblies associated therewith. The fluid pressure so established in the outlet chamber 143 acts on the effective area of the lower area 141b of the piston 140 creating a reaction force which moves the piston 140 upwardly to engage the upper end 141a thereof with the piston 150; however, this upward movement of the piston 140 permits the valve elements 133 to close, and it is necessary for the operator to slightly increase the treadle stroke to effect further concert movement of the pistons 140 and 150 to further actuate the valve element 133 and meter fluid pressure to the brake chambers 8. Since pistons 140 and 150 are in abutment, the reaction force is directly opposed to the manually applied force to afford the operator a direct and accurate "feel" as to the extent of the braking application. It should be noted that the lost or increased operator pedal stroke is maintained at a minimum upon failure of the branch 2. In other words, the lost stroke indicates only the movement of the piston 140 into engagement with the piston 150 after the valve elements 133 and 167 are opened.

In the event of the failure of the branch 3 with the resultant loss of the fluid pressure in the reservoir 10, the manually applied force moves the pistons 150 and 140 downwardly to actuate valve elements 167 and 133, as previously described. Since it is assumed that the branch 3 has failed, the establishment of fluid pressure in said branch is, of course, obviated; however, fluid pressure flow is established in the branch 2 to actuate the brake chambers 8 and energize the wheel brake assemblies assocated therewith. The fluid pressure so established in the outlet chamber 154a acts on the effective area of the end 141a of the piston 140 to move said piston further downwardly into abutment with the piston stop 122a on the housing wall 121; however, this downward movement permits the valve element 167 to close, and it is necessary for the operator to slightly increase the treadle stroke to effect further downward movement of the piston 166 to further actuate the valve element 167 and meter fluid pressure to the brake chambers 8. The fluid pressure metered to the brake chambers 8 also acts on the effective area of the piston 150 in the outlet chamber 154a to create a reaction force substantially equal and opposite to the manually applied force thereby affording the operator a direct and accurate "feel" as to the extent of the braking application. It should be noted that the lost stroke or increased treadle stroke is maintained at a minimum upon failure of the branch 3. In other words, the lost stroke represents only the movement of the piston 140 into engagement with the piston stop 122a after the valve elements 133 and 167 are open.

In the above-described operation of the control valve 105 in the system 1, the substantially simultaneous actuation of the system branches 2 and 3 or the opening of valve elements 133 and 167 has been predetermined by substantially balancing the magnitudes of the combined forces of the valve and return springs 173 and 154 and the seating force of the valve element 167 against that of the combined forces of the valve and return springs 139 and 149 and the seating force on the valve element 133. It therefore follows that if the magnitudes of the combined forces are predeterminately unbalanced, it is possible to predeterminately control the sequence of actuation of the system branches 2 and 3 or of the opening of the valve elements 133 and 167. This sequenced operation of the control valve 105 is substantially the same as that described above for the balanced operation of said control valve except that the manually applied force on the piston 150 will effect the opening of only one of the valve elements 133 or 167, and the fluid pressure metered into either of the outlet chamber 143 or the outlet chamber 154a by the opened valve element will act on the effective area of the piston 140 to move the piston 140 in a valve element opening direction to either engage its seat 146 with valve element 133 to effect the unseating or opening thereof or to move the seat 147 of the piston 140 into engagement with the valve element 167 to effect unseating or opening thereof. In this manner, the valve elements 133 and 167 are opened in sequence and fluid pressure flow is sequentially established in branches 2 and 3. Further, it is obvious that the fluid pressure first applied by the first opened valve element will react against the piston 140 thereby tending to lap the first opened valve element and, at the same time, open the other or thus far unactuated valve element. It is apparent that the last opened valve element will meter a fluid pressure having a lesser magnitude than that metered by the first opened valve element due to the predetermined proportional difference in the magnitudes of the above discussed forces which control the sequential opening of said valve elements.

Figure 4:
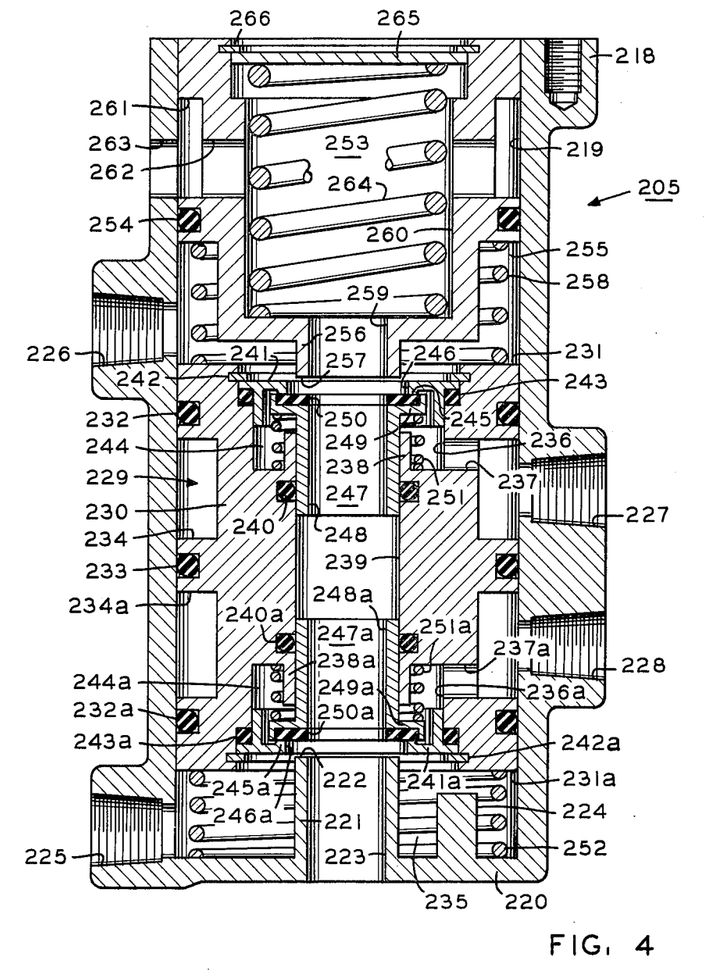

Referring now to FIG. 3, a tandem-type control valve 205 is shown for connection in the system 1 and functions therein in substantially the same manner as the previously described tandem type control valves 5 and 105 with the following exceptions. The control valve 205 is provided with a housing 218 having an axial bore 219 therein, one end of said bore being open and the other end thereof being defined by a radially extending end wall 220 integrally formed with said housing. A cylindrical extension 221 is integrally formed on the end wall 220 extending coaxially into the bore 219, and an exhaust valve seat 222 is provided on the free end of said extension with an exhaust opening or passage 223 extending therethrough forming an exhaust port in the housing 218. A piston stop 224 is also integrally provided on the housing end wall 220. The housing is also provided with an outlet port 225 which receives the conduit 12, as previously mentioned, and connects with the bore 219 adjacent to the housing end wall 220. Another oulet port 226 is also provided in the housing 218 and connects with the bore 219 between the mid-portion and open end thereof, said outlet port 226 receiving the conduit 11, as previously mentioned. A pair of axially spaced inlet ports 227 and 228 are positoned in the housing 218 to connect with the bore 219 between the outlet ports 225 and 226, said inlet ports 227 and 228 receiving the service conduits 6 and 11, respectively, as previously mentioned. As will become apparent hereinafter, inlet and outlet ports 226 and 227 form one separate set of ports and inlet and outlet ports 225 and 228 form another separate set of ports.

A piston or valve control member, indicated generally at 229, is provided with a body 230 slidable in the bore 219 between the port sets 226, 227 and 225, 228. The piston body 230 is provided with upper and lower opposed ends 231, 231a of substantially equal area, and the piston body upper end 231 is movable between inlet and outlet ports 227 and 226 while the piston body lower end 231a is movable between inlet and outlet ports 228 and 225. Seals 232, 232a and 233 are carried in the peripheral surface of the piston body 230 adjacent the upper and lower piston ends 231, 231a and the mid-portion thereof, respectively, and upper and lower peripheral grooves or recesses 234, 234a are also provided in the peripheral surface of said piston body between seals 232, 233 and seals 232a, 233, respectively, said peripheral grooves 234, 234a being in open communication with inlet ports 227, 228 at all times. An outlet chamber 235 is formed in the bore 219 between the housing wall 220 and the piston body lower end 231a in communication with the outlet port 225 and the exhaust passage 223.

The piston body 230 is provided with centrally located stepped bores 236, 236a in the upper and lower ends 231, 231a thereof which are connected by passages 237, 237a with the peripheral grooves 234, 234a. Valve guide hubs 238 and 238a are integrally formed on the piston body 230 and extend coaxially into the stepped bores 236, 236a, and a valve guide bore or exhaust passage 239 extends coaxially through said hubs between said stepped bores. The valve guide bore 239 carries valve receiving seals 240, 240a positioned adjacent the upper and lower ends thereof. Walls or seating members 241, 241a are positioned in the stepped bores 236, 236a of the piston body 230 and retained therein against displacement by snap ring and groove assemblies 242, 242a provided adjacent the upper and lower ends of the stepped bores 236, 236a, respectively, and seals 243, 243a are sealably engaged between said walls and the shoulders formed on said stepped bores. Inlet or valve chambers 244, 244a are defined in the stepped bores 236, 236a by the wall members 241, 241a and include passages 237, 237a and grooves 234, 234a, said inlet chambers being in open communication with inlet ports 227 and 228, respectively, at all times. Valve seats 245, 245a are provided on wall members 241, 241a in inlet chambers 244, 244a, and connecting passages 246, 246a extend coaxially through said valve seats and wall members.

Valve elements 247, 247a are slidably received in the upper and lower ends of the valve guide bore 239 in sealing engagement with seals 240, 240a therein. Valve elements 247, 247a are provided with axial bores or exhaust openings 248, 248a therethrough and have enlarged sealing heads 249, 249a on one of the ends thereof which include annular resilient sealing members or discs 250, 250a. Valve springs 251, 251a are provided between the piston body 230 and the sealing heads 249, 249a and normally urge the valve seals 250, 250a into sealing engagement with the valve seats 245, 245a formed on the wall members 241, 241a. A return spring 252 is interposed between the piston body lower end 231a and the housing wall 220 and normally maintains the valve element seal 250a in predetermined spaced relation with the exhaust valve seat 222 on the housing wall extension 221.

Another piston or valve control member 253 is slidably received in the upper end of the housing bore 219, and a seal 254 is carried by said piston in sealing engagement with said housing bore. Another outlet or reaction chamber 255 is formed in the housing bore 219 between the piston 253 and the upper end 231 of the piston 229 in open communication with the outlet port 226. The piston 253 is provided with an integral extension 256 having a valve seat 257 on the lower or free end thereof which is coaxial with the connecting passage 246 in the piston wall member 241, and said valve seat is normally maintained in predetermined spaced relation with the valve seal 250 of the valve element 247 by a return spring 258 biased between the piston body upper end 231 and the piston 253, said return spring normally urging the piston 253 away or apart from the piston 229 to its normal released or inoperative position. An exhaust passage or opening 259 extends coaxially through the valve seat 257 and extension 256 and connects with a metering spring bore 260 in the piston 253. A peripheral groove 261 is provided in the piston 253 between the upper end thereof and the seal 254 and is connected with the piston bore 260 by a plurality of cores passages 262, said peripheral groove being in open communication at all times with an exhaust port 263 provided in the housing 218 and connecting with the housing bore 219 adjacent to the upper or open end thereof. The outlet port 226 and chamber 255 are normally vented to atmosphere through the exhaust passage 259, the metering spring bore 260, the cross passage 262 and peripheral groove 261 to the exhaust port 263. To complete the control valve 205, a precompressed metering spring 264 is provided in the piston bore 260 and biased between the piston 253 and a retainer or pedal force receiving plate 265 slidably positioned on said piston bore. The plate 265 is normally urged by the metering spring 265 into abutting engagement with a snap ring and groove assembly 266 adjacent the upper end of the piston bore 260.

Although the exhaust passage 259 is shown and described as communicating the outlet chamber 255 with the atmosphere, it is apparent that said exhaust passage can be alternatively omitted from the construction of the control valve 205 since said outlet chamber can also be vented to atmosphere through the valve element exhaust openings 248, 248a and piston body bore 239 to the exhaust passage 223 in the housing extension 221. Another alternative constrution is to omit the exhaust passage 223 in the housing extension 221 so that the chamber 235 is vented to the atmosphere through the valve element exhaust openings 248, 248a and piston body bore 239 to the exhaust passage 259 in the piston extension 259. And, of course, still another alternative construction is to omit the exhaust openings 248, 248a from valve elements 247, 247a wherein the outlet chambers 235 and 255 would be vented to atmosphere through the exhaust passage 223 in the housing extension 221 and the exhaust passage 259 in the piston 253, respectively.

In the operation of the above described control valve 205 in the system 1, it is preferred to predetermine substantially simultaneous actuation of the system branches 2 and 3 by effecting substantially simultaneous opening of the valve elements 247, 247a. This is accomplished by substantially balancing the magnitudes of the combined forces of valve and return springs 251, 258 and the seating force of the fluid pressure in the inlet chamber 244 acting to maintain the valve element 247 in engagement with the seat 245 against the magnitudes of the combined forces of the valve and return springs 251a, 252 and the seating force of the fluid presure in the inlet chamber 244a acting to maintain the valve element 247a in engagement with the seat 245a.

Assuming that the abovementioned forces which control the sequence of operation of the valve elements 247, 247a are substantially balanced as above described, a manual force applied by the operator through the foot treadle to the force receiving plate 263 of the piston 253 moves said piston downwardly to engage the seat 257 with the valve element 247 closing the exhaust openings 248 and 259 to isolate the outlet chamber 255 from the atmosphere. At the same time, the manual force is transmitted through the return spring 258 to effect substantially simultaneous downward movement of the piston 229 against the compressive force of the return spring 252 to engage the valve element 247a with the valve seat 222 on the housing wall 252 closing the exhaust openings 248a and 223 to isolate the outlet chamber from the atmosphere. Further downward movement of the pistons 229 and 253 effects the disengagement of the piston valve seat 245a from the valve element 247a and the substantially simultaneous disengagement of the valve element 247 from the piston valve seat 245 to establish pressure fluid communication between inlet and outlet ports 228, 225 and inlet and outlet ports 227, 226, respectively. The pressure fluid flows in the system branch 2 from the reservoir 4 through the conduit 6, the inlet port 227, the inlet chamber 244, and the connecting passage 246 into the outlet chamber 255 and therefrom via the outlet port 226 into the service line 7 to actuate brake chambers 8 which, in turn, rotate slack adjusters 9 to energize the axle set of vehicle wheel brake assemblies associated therewith. Pressure fluid also flows in the system branch 3 from the reservoir 10 through the conduit 11, the inlet port 228, the inlet chamber 244a and the connecting passage 246a into the outlet chamber 235 and therefrom via the outlet port 225 into the service line 12 to actuate brake chambers 13 which, in turn, rotate slack adjusters 14 to energize the axle set of vehicle wheel brake assemblies associated therewith. It should be noted that the magnitudes of the fluid pressures so metered by valve elements 247, 247a into system branches 2, 3 are substantially equal due to the aforementioned predetermined equalization of the forces controlling the sequence of operation of said valve elements. Also, the valve elements 247, 247a are substantially balanced in their open positions and the areas of the piston body ends 231, 231a are substantially equal; therefore, the reaction forces of the substantially equal fluid pressures in the outlet chambers 235, 255 acting on said piston body ends are self-cancelling.

When the reaction force created by the established fluid pressure in the outlet chamber 255 acting on the effective area of the piston 253 equals the manually applied force, the piston 253 is moved upwardly against the metering spring 260, and the force of the return spring 252 effects concert upward movement of the piston 229 therewith. This upward movement of pistons 229, 253 positions valve elements 247, 247a in lapped engagement with their piston valve seats 245, 245a and also the housing valve seat 222 and the piston extension valve seat 257. The reaction force acting through the metering spring 260 against the manually applied force on the plate 263 is substantially equal and opposite thereto and affords the operator a direct and accurate "feel" as to the extent of the braking effort or application. If greater braking effort is desired, the manually applied force is increased which results in an increased application force, and the component parts of the control valve 205 functions in the same manner, as previously described, to again move said component parts to their lapped positions.

When the desired braking effort is attained, the manually applied force is removed from the piston 253, and return springs 252, 258 and the reaction forces move pistons 229, 253 upwardly toward their original positions. This upward movement disengages the valve element 247a from the valve seat 222 and disengages the valve seat 257 from the valve element 247 to open the valve element exhaust openings 248, 248a along with the housing exhaust passages 223 and the piston extension exhaust passage 259 which re-establishes communication between outlet chambers 235, 255 and the atmosphere. In this manner, the wheel brake assemblies associated with brake chambers 8 are de-energized and the reaction forces are eliminated by exhausting fluid pressure from said brake chambers through the conduit 7, the outlet port 226, the outlet chamber 225, the exhaust passage and bore 259, 260 and the cross-passages 262 and peripheral groove 261 to the exhaust port 263. At the same time, the wheel brake assemblies associated with the brake chambers 13 are also de-energized by exhausting fluid pressure from said brake chambers through the conduit 12, the outlet port 225, the outlet chamber 235, and therefrom through the housing exhaust passage 223 to the atmosphere.

In the event of failure of the branch 2 with the resultant loss of the fluid pressure in the reservoir 4, the manually applied force moves the pistons 229, 253 downwardly to open the valve elements 247, 247a, previously described. Since it is assumed that the branch 2 has failed, the establishment of fluid pressure therein is, of course, obviated; however, fluid pressure flow is established in branch 3 to actuate brake chambers 13 and energize the wheel brake assemblies associated therewith. The fluid pressure so established in the outlet chamber 235 acts on the effective area of the piston body lower end 231a creating a reaction force which moves the piston 229 upwardly to engage the piston body upper end 231 with the piston 253; however, this upward movement of the piston 229 permits the valve element 247a to close and it is necessary for the operator to slightly increase the treadle stroke to effect concert downward movement of the abutted pistons 229, 253 to again move the valve element 247a to an open position and meter fluid pressure to the brake chambers 13. Since pistons 229, 253 are in abutment, the reaction force is directly opposed to the applied force to afford the operator a direct and accurate "feel" as to the extent of the braking application. It should be noted that the lost or increased operator treadle stroke is maintained at a minimum upon the failure of the branch 2. In other words, the lost stroke represents only the movement of the piston 229 into engagement with the piston 253 after valve elements 247, 247a are initially opened.

In the event of the failure of branch 3 with the resultant loss of the fluid pressure in the reservoir 10, the manually applied force moves the pistons 229, 253 downwardly to open valve elements 247, 247a, as previously described. Since it is assumed that the branch 3 has failed, the establishment of fluid pressure in said branch is, of course, obviated; however, fluid pressure flow is established in the branch 2 to actuate the brake chambers 8 and energize the wheel brake assemblies associated therewith. The fluid pressure so established in the outlet chambers 255 acts on the piston body upper end 231 to move the piston 229 further downwardly into engagement with the piston stop 224 on the housing end wall 220; however, this downward movement permits the valve element 247 to close, and it is necessary for the operator to slightly increase the treadle stroke to effect further downward movement of the piston 253 to again open the valve element 247 and meter fluid pressure to the brake chamber 8. The fluid pressure metered to the brake chambers 8 also acts on the effective area of the piston 253 in the outlet chamber 255 to create a reaction force substantially equal and opposite to the applied force thereby affording the operator a direct and accurate "feel" as to the extent of the braking application. It should be noted that the lost stroke or increased treadle stroke is maintained at a minimum upon failure of the branch 3. In other words, the lost stroke represents only the movement of the piston 229 into engagement with the piston stop after the valve elements 247, 247a are initially opened.

In the above described operation of the control valve 205 in the system 1, the substantially simultaneous actuation of branches 2, 3 or the opening of valve elements 247, 247a has been predetermined by substantially balancing the magnitudes of the combined forces of the valve and return springs 251, 258 and the seating force on the valve element 247 against that of the combined forces of the valve and return springs 251a, 252 and the seating force on the valve element 247a. It therefore follows that if the magnitudes of the combined forces are predeterminately unbalanced, it is possible to predeterminately sequence the opening of valve elements 247, 247a. This sequenced operation of the valve elements 247, 247a is substantially the same as that described for the balanced or simultaneous operation thereof except that the manually applied force on the piston 253 will initially effect the opening of only one of said valve elements, and the fluid pressure metered into either the outlet chamber 235 or the outlet chamber 255 by the first opened valve element will act on the piston 229 to move said piston 229 in a valve opening direction to either engage the valve element 247a with the housing valve seat 222 to effect the opening thereof or to engage the valve element 247 with the extension valve seat 257 on the piston 253 to effect the opening thereof. In this manner, valve elements 247, 247a are opened in sequence to sequentially establish pressure fluid flow in branches 2, 3. Further, it is obivous that the fluid pressure first applied by the first opened valve element will react against the piston 229 thereby tending to lap such first opened valve element and, at the same time, open the other or the thus far unopened valve element. It is apparent that the last opened valve element will meter a fluid pressure having a lesser magnitude than that metered by the first opened valve element due to the predetermined proportional difference on the magnitudes of the above discussed forces which control the sequential operation or opening of said valve elements.

From the foregoing, it is now apparent that a novel control valve meeting the objects set out hereinbefore is provided and that changes or modifications as to the precise configurations, shapes or details of the construction set forth in the disclosure by way of illustration may be made by those skilled in the art without departing from the spirit of the invention as defined by the claims which follow.

What I claim is:

1. A control valve comprising a housing having a first inlet chamber therein, a pair of valve control members concertly movable in said housing in response to an applied force, one of said valve control members defining with said housing a first outlet chamber, a first connecting passage in said housing between said first inlet and outlet chambers, a first valve seat in said first inlet chamber in circumscribing relation with said first connecting passage, first valve means in said first inlet chamber normally urged into engagement with said first valve seat to interrupt pressure fluid communication between said first inlet and outlet chambers, first extension means on said one valve control member for operative engagement with said first valve means, a second outlet chamber defined in said housing between said pair of valve control members, said one valve control member also defining with said housing a second inlet chamber between said first and second outlet chambers, a second connecting passage in said one valve control member between said second inlet and outlet chambers, a second valve seat in said second inlet chamber in circumscribing relation with said second connecting passage, second valve means in said second inlet chamber normally urged into engagement with said second valve seat to interrupt pressure fluid communication between said second inlet and outlet chambers, and second extension means on the other of said valve control members for operative engagement with said second valve means, said pair of valve control members being concertly movable in response to the applied force to initially engage said first and second extension means with said first and second valve means and thereafter move said first and second valve means to positions disengaged from said first and second valve seats and establishing pressure fluid communication between said first and second inlet and outlet chambers, respectively.

2. The control valve according to claim 1 comprising a first exhaust opening in said first valve means normally venting said first outlet chamber to the atmosphere, a third valve seat on said first extension means for engagement with said first valve means about said first exhaust opening, and a second exhaust opening in said other valve control member extending through said second extension means normally venting said second outlet chamber to the atmosphere, and a fourth valve seat on said second extension means for engagement with said second valve means and in circumscribing relation with said second exhaust opening, said third and fourth valve seats being movable into engagement with said first and second valve means in response to the applied force movement of said pair of valve control members to close said first and second outlet chambers from the atmosphere.

3. The control valve according to claim 1 comprising a first exhaust opening in said first valve means normally venting said first outlet chamber to the atmosphere, a third valve seat on said first extension means for engagement with said first valve means about said first exhaust opening, an exhaust passage in said one valve control member and first extension means extending through said third valve seat, a second exhaust opening in said second valve means connected in pressure fluid communication between said exhaust passage and said second outlet chamber and normally venting said second outlet chamber to the atmosphere, and a fourth valve seat on said second extension means for engagement with said second valve means about said second exhaust opening, said third and fourth valve seats being movable into engagement with said first and second valve means upon the applied force movement of said pair of valve control members to close said first and second exhaust openings and isolate said first and second outlet chambers from the atmosphere.

4. The control valve according to claim 1 comprising a first exhaust opening in said other valve control member and second extension means normally venting said second outlet chamber with the atmosphere, a third valve seat on said second extension means for engagement with said second valve means and in circumscribing relation with said first exhaust opening, a second exhaust opening in said second valve means, said third valve seat being adapted for engagement with said second valve means about said second exhaust opening, an exhaust passage in said first extension means normally in open pressure fluid communication between said second exhaust opening and said first outlet chamber to vent said first outlet chamber to the atmosphere, and a fourth valve seat on said first extension means for engagement with said first valve means and in circumscribing relation with said exhaust passage, said third and fourth valve seats being movable in response to the applied force movement of said pair of valve control members into engagement with said second and first valve means to close said first and second exhaust openings and isolate said second and first outlet chambers from the atmosphere, respectively.

5. The control valve according to claim 1 comprising first and second exhaust openings in said first and second valve means, third and fourth valve seats on said first and second extension means for engagement with said first and second valve means about said first and second exhaust openings, an exhaust passage in said first extension means extending through said third valve seat and connecting with said second exhaust in said second valve means, said second exhaust opening and exhaust passage being normally connected in open pressure fluid communication between said first and second outlet chambers and said first exhaust opening normally venting said first outlet chamber to the atmosphere, and a third exhaust opening in said second extension means extending through said fourth valve seat and normally venting said second outlet chamber to the atmosphere, said third and fourth valve seats being movable in response to the applied force movement of said pair of valve control members into engagement with said first and second valve means to close said first, second and third exhaust openings and said exhaust passage and isolate said first and second outlet chambers from the atmosphere, respectively.

6. The control valve according to claim 1 comprising a bore in said housing defining said first inlet chamber, a first inlet port in said housing intersecting said bore and being in open pressure fluid communication with said first inlet chamber, a counterbore in said housing, a radially extending wall in said housing between adjacent ends of said bore and counterbore and defining said first connecting passage, said first valve seat being provided on said wall, a first outlet port in said housing intersecting said counterbore adjacent to said wall and being in open pressure fluid communication with said first outlet chamber, a second outlet port in said housing intersecting said counterbore between the other end thereof opposite to said wall and said first outlet port and being in open pressure fluid communication with said second outlet chamber, said other valve control member being slidable in said counterbore between said other end thereof and said second outlet port and said one valve control member being slidable in said counterbore between said first and second outlet ports, and a second inlet port in said housing intersecting said counterbore between said first and second outlet ports and being in open pressure fluid communication with said second inlet chamber at all times.

7. The control valve according to claim 6 comprising first radially extending flanges means on said one valve control member and slidable in said counterbore between said first outlet port and said second inlet port, second radially extending flange means on said one valve control member and slidable in said counterbore between said second inlet and outlet ports, and means in said one valve control member defining said second inlet chamber including peripheral groove means between said first and second flange means in open pressure fluid communication with said second inlet port at all times, a valve chamber, said second connecting passage being connected between said second outlet chamber and said valve chamber and said second valve seat being in said valve chamber in circumscribing relation with said second connecting passage, and cross-passage means connected between said valve chamber and said peripheral groove means, said second valve means being movable in said valve chamber, and spring means biased between a wall of said valve chamber and said second valve means to normally urge said second valve means into engagement with said second valve seat.

References Cited by the Examiner

UNITED STATES PATENTS 3,003,825  10/1961  Kemble ______________ 303—54

FOREIGN PATENTS 529,739  7/1954  Belgium.
732,959  6/1955  Great Britain.
1,074,990  2/1960  Germany.
1,183,209  7/1959  France.

ARTHUR L. LA POINT, *Primary Examiner.*

EUGENE G. BOTZ, *Examiner.*